United States Patent
Nauen

(10) Patent No.: US 11,536,840 B2
(45) Date of Patent: Dec. 27, 2022

(54) METHOD FOR OBJECT RECOGNITION

(71) Applicant: OSRAM GmbH, Munich (DE)

(72) Inventor: Andre Nauen, Regensburg (DE)

(73) Assignee: OSRAM BETEILIGUNGSVERWALTUNG GMBH, Grunwald (DE)

( * ) Notice: Subject to any disclaimer, the term of this patent is extended or adjusted under 35 U.S.C. 154(b) by 843 days.

(21) Appl. No.: 16/258,690

(22) Filed: Jan. 28, 2019

(65) Prior Publication Data

US 2019/0250272 A1    Aug. 15, 2019

(30) Foreign Application Priority Data

Feb. 14, 2018    (DE) .................. 10 2018 202 240.2

(51) Int. Cl.
| | |
|---|---|
| G01S 17/00 | (2020.01) |
| G01S 17/74 | (2006.01) |
| G01S 7/48 | (2006.01) |
| G06K 19/02 | (2006.01) |
| G01S 17/10 | (2020.01) |
| G06K 7/12 | (2006.01) |
| G01S 17/89 | (2020.01) |
| G06K 7/10 | (2006.01) |

(52) U.S. Cl.
CPC ............ *G01S 17/74* (2013.01); *G01S 7/4802* (2013.01); *G01S 17/10* (2013.01); *G01S 17/89* (2013.01); *G06K 7/12* (2013.01); *G06K 19/027* (2013.01); *G06K 2007/10495* (2013.01)

(58) Field of Classification Search
USPC ..................................................... 356/5.01
See application file for complete search history.

(56) References Cited

U.S. PATENT DOCUMENTS

| | | | |
|---|---|---|---|
| 5,831,551 A | 11/1998 | Geduld | |
| 2010/0032584 A1* | 2/2010 | Dayong | G01N 15/14 977/773 |
| 2014/0122017 A1* | 5/2014 | Chu | G01S 5/14 315/200 R |
| 2014/0156178 A1 | 6/2014 | Yoo | |
| (Continued) | | | |

FOREIGN PATENT DOCUMENTS

| | | | |
|---|---|---|---|
| DE | 4413886 C1 * | 4/1995 | ....... G08G 1/096716 |
| DE | 4413886 C1 | 4/1995 | |
| (Continued) | | | |

OTHER PUBLICATIONS

German Search Report based on Application No. 10 2018 202 240.2 (6 pages) dated Aug. 1, 2018 for reference purpose only).

*Primary Examiner* — James R Hulka

(74) *Attorney, Agent, or Firm* — Viering Jentschura & Partner mbB

(57) ABSTRACT

A method for recognizing an object located in an object space includes emitting a distance measuring pulse into the object space by a signal time-of-flight based distance measuring unit. The object is provided with a marker which, in response to the influence of the distance measuring pulse, emits electromagnetic marker radiation in which object information for the object recognition is stored. The method further includes recording the marker radiation by an electrical radiation detector and the object information for object recognition being assigned to the object.

20 Claims, 3 Drawing Sheets

(56) References Cited

U.S. PATENT DOCUMENTS

| | | | | |
|---|---|---|---|---|
| 2015/0053897 A1* | 2/2015 | Maurice | .......... | H01L 31/035218 |
| | | | | 977/932 |
| 2015/0342723 A1* | 12/2015 | Abramson | .............. | A61F 2/141 |
| | | | | 623/6.64 |
| 2017/0205903 A1* | 7/2017 | Miller | ................... | G06T 19/006 |
| 2019/0155374 A1* | 5/2019 | Miller | ..................... | G06F 3/012 |
| 2019/0195979 A1* | 6/2019 | Bucknor | ............ | G02B 27/0093 |

FOREIGN PATENT DOCUMENTS

| | | | | |
|---|---|---|---|---|
| DE | 102005054786 A1 * | 5/2007 | .............. | G08G 1/09 |
| DE | 102005054786 A1 | 5/2007 | | |
| DE | 102006035170 A1 | 1/2008 | | |
| DE | 102007004348 A1 | 7/2008 | | |
| DE | 102013205875 A1 | 6/2014 | | |

\* cited by examiner

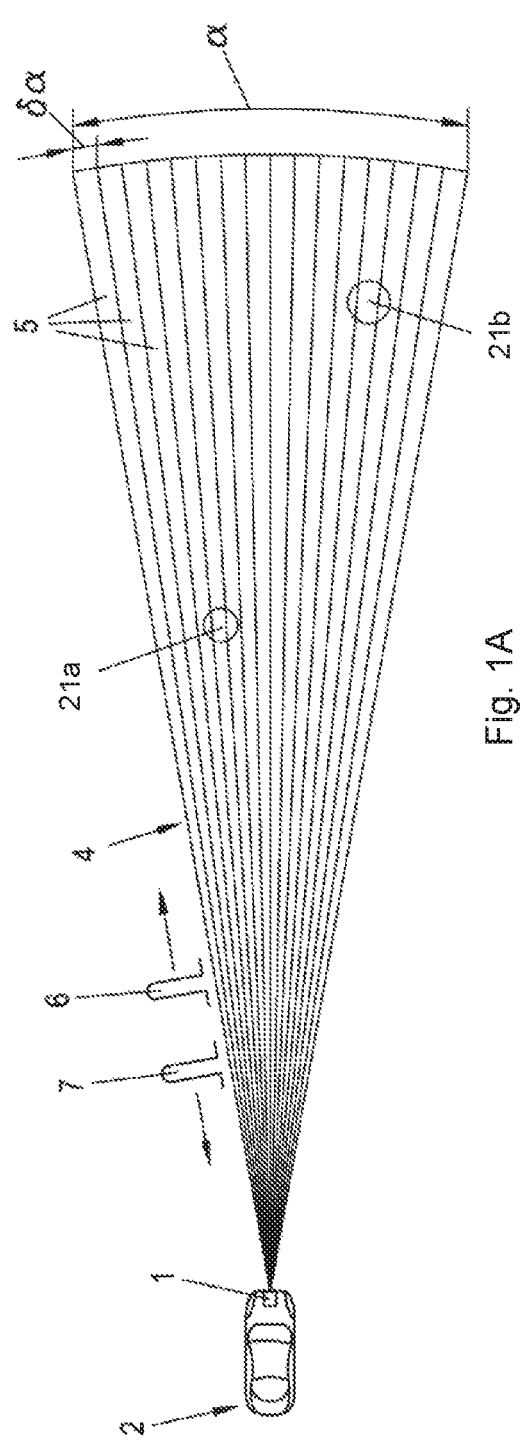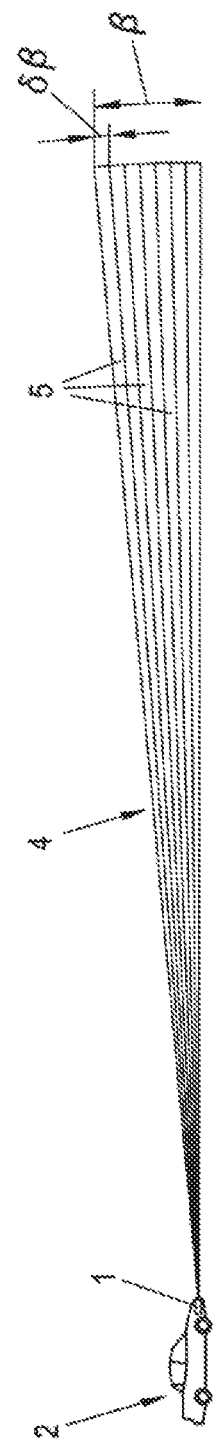

METHOD FOR OBJECT RECOGNITION

CROSS-REFERENCE TO RELATED APPLICATION

This application claims priority to German Patent Application Serial No. 10 2018 202 240.2, which was filed Feb. 14, 2018, and is incorporated herein by reference in its entirety.

TECHNICAL FIELD

Various embodiments relate generally to a method for object recognition, in which a distance measuring unit is used for distance measurement.

BACKGROUND

The distance measurement in question is based on a time-of-flight measurement of emitted pulses, in particular electromagnetic pulses. When these strike an object, the pulse is partially reflected at the surface of the latter back to the distance measuring unit, and may be recorded as an echo pulse with a suitable sensor. If the emission of the pulse takes place at a time $t_0$ and the echo pulse is recorded at a later time $t_1$, the distance d to the reflecting surface of the object can be determined by means of the time of flight $\Delta t_A = t_1 - t_0$ according to $$d = \Delta t_A c / 2 \qquad \text{Eq. 1}$$

When electromagnetic pulses are involved, c is the value of the speed of light.

SUMMARY

A method for recognizing an object located in an object space includes emitting a distance measuring pulse into the object space by a signal time-of-flight based distance measuring unit. The object is provided with a marker which, in response to the influence of the distance measuring pulse, emits electromagnetic marker radiation in which object information for the object recognition is stored. The method further includes recording the marker radiation by an electrical radiation detector and the object information for object recognition being assigned to the object.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1A shows a motor vehicle having a distance measuring unit, as well as the object field of the latter, subdivided into solid angle segments, in a plan view;

FIG. 1B shows the arrangement according to FIG. 1A in a side view;

DESCRIPTION

Figure 2:
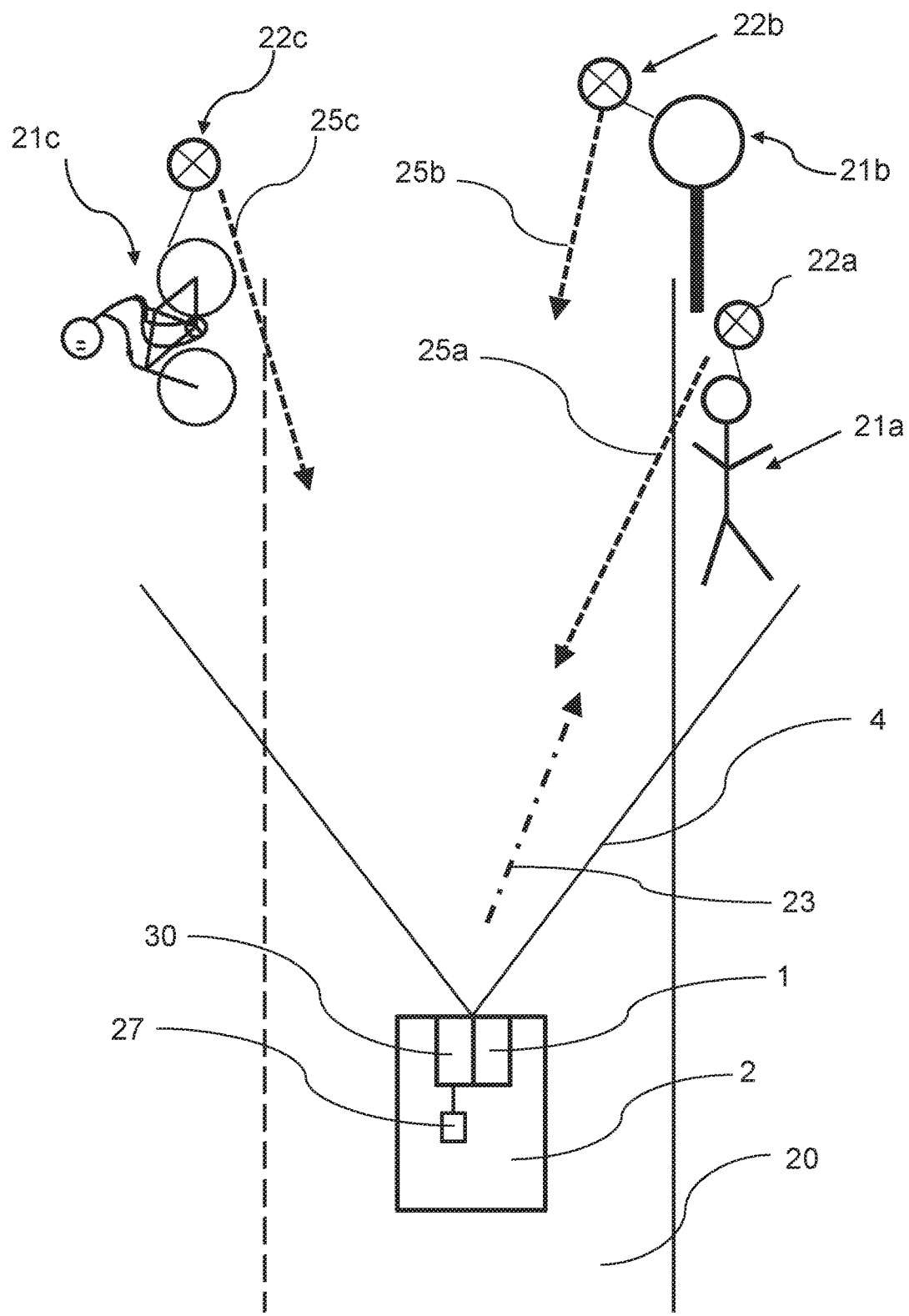
FIG. 2 shows the method according to various embodiments in a schematic representation.

The following detailed description refers to the accompanying drawings that show, by way of illustration, specific details and embodiments in which the invention may be practiced.

Various embodiments provide a method for object recognition by using a signal time-of-flight based distance measuring unit.

Various embodiments provide a method for object recognition. In this case, the object, which is located in the object space into which the distance measuring unit emits for the distance measurement, is provided with a marker. This marker is excited or activated by the pulse or pulses of the distance measuring unit, and thereupon emits marker radiation. Object information for recognition of the object is stored in this marker radiation. The marker radiation is then recorded with a radiation detector, which may be part of the distance measuring unit but need not be, and the object information is assigned to the object.

The effects of this method may be illustrated best with the aid of an exemplary application, namely use in road traffic. The distance measuring unit may be integrated in a motor vehicle, e.g. in order to assist a semiautonomous or fully autonomous driving function. The object provided with the marker may for example be a different road user, for instance a different motor vehicle or a pedestrian or cyclist, but, for example, a traffic sign or the like may also be provided with the marker (for example also a bridge with a particular maximum allowed weight-bearing capacity or a thoroughfare with a particular allowed maximum height).

As soon as the object is in the object field, i.e. in the field of view (FoV) of the distance measuring unit, the marker is excited or activated by the exemplary electromagnetic distance measuring radiation and in turn emits the marker radiation. This is recorded with the radiation detector, which in this example is part of the motor vehicle (which includes the emitting distance measuring unit), and an evaluation unit of the motor vehicle may assign the object information to the object. The object may be assigned to a particular object class, which may be displayed to the vehicle driver or taken into account internally in the scope of the semiautonomous or fully autonomous driving function. Depending on whether, for example, a pedestrian at the roadside or a lamppost is involved, the driving strategy may be adapted accordingly (for example greater safety distance in the case of a pedestrian).

In general, the distance measuring unit is preferably solid angle-resolving in at least one direction, i.e. the object space can be measured in a segmented fashion with the distance measuring unit in at least one, preferably a plurality of directions. Per segment, this gives a separate distance value and a three-dimensional point cloud (of distance values) can be obtained for the object space overall from the distance measurement. Then, image processing methods may also be applied to this point cloud in order to recognize or classify a recorded object. This may, however, on the one hand suffer from a certain computation outlay and correspondingly time outlay, which may for example be disadvantageous with a view to relatively short reaction times in road traffic, or the complexity of decision-making processes in semiautonomous or fully autonomous driving. Furthermore, object recognition or classification may be affected by error as a function of the solid angle resolution or the distance of the object (particularly in the case of objects at a large distance).

With the object information stored in the marker radiation, conversely, unique classification is possible when objects, which belong to different object classes, are provided with markers that differ in the object information respectively stored in the marker radiation. For instance in comparison with the aforementioned image evaluation methods, the markers can shorten the recognition times. Other object recognition methods, for example evaluation of the point clouds, are of course still possible, and the marker-based recognition may to this extent also represent an advantageous enhancement.

Various configurations may be found in the dependent claims and the entire disclosure, distinction not always being made in detail in the presentation of the features between method aspects and use aspects or device aspects; at least, the disclosure is implicitly to be interpreted in relation to all claim categories. Thus if, for example, a particular method is described, this is always also to be interpreted in relation to a correspondingly configured distance measuring system, or marker, and vice versa.

Depending on the configuration in detail, the distance measuring unit may emit a respective pulse for distance measurement either into the entire object field, including in the case of solid angle resolution, or the pulses may be emitted sequentially (in succession) into different segments (also referred to as "scanning operation"). The variant mentioned first may then, in conjunction with a solid angle-sensitive detector, still give a solid angle resolution. Independently thereof in detail, the pulses are emitted in the form of electromagnetic radiation. For example in the case of a motor vehicle, enhancement of the distance measuring unit with other measuring systems is of course also possible, for instance camera and/or ultrasound systems, in which case the various data may also be correlated together.

As already mentioned, in a configuration, the distance measuring unit emits the pulse or pulses in the form of electromagnetic distance measuring radiation into the object space. In general, however, the pulses could for example also be ultrasound pulses. In comparison therewith, however, the electromagnetic pulses are provided, for example because of the shorter times of flight, which can give a greater range and/or a better angle resolution.

In various embodiments, the distance measuring unit emits radiation in the infrared range, i.e. wavelengths of for example at least 600 nm, 650 nm, 700 nm, 750 nm, 800 nm or 850 nm (increasingly preferred in the order mentioned). In various embodiments the wavelengths may, for example, be around 905 nm, and in this regard e.g. upper limits may be at most 1100 nm, 1050 nm, 1000 nm or 950 nm (increasingly preferred in the order mentioned). Another exemplary value may, for example, lie around 1064 nm, which gives exemplary lower limits of at least 850 nm, 900 nm, 950 nm or 1000 nm and (independently thereof) exemplary upper limits of at most 1600 nm, 1500 nm, 1400 nm, 1300 nm, 1200 nm or 1150 nm (in each case increasingly preferred in the order mentioned). Exemplary values may also lie around 1548 nm or 1550 nm, which gives exemplary lower limits of at least 1350 nm, 1400 nm, 1450 nm or 1500 nm and (independently thereof) exemplary upper limits of at most 2000 nm, 1900 nm, 1800 nm, 1700 nm, 1650 nm or 1600 nm (in each case increasingly preferred in the order mentioned). In general, however, wavelengths in the far IR (infrared) may for example also be envisioned, for example at 5600 nm or 8100 nm.

A pulse is a temporally limited quantity, which is emitted, before then, in the case of reflection at the object, being recorded by a sensor of the distance measuring unit with a time offset. A pulse width, taken according to the full-width at half-maximum (FWHM) may, for example, be at most 1 ms, e.g. even much smaller, namely increasingly preferred in the order mentioned, preferably at most 800 µs, 600 µs, 400 µs or 200 µs, or also even smaller, namely at most 1000 ns, 900 ns, 800 ns, 700 ns, 600 ns, 500 ns, 400 ns, 300 ns, 200 ns, 100 ns, 80 ns, 60 ns, 40 ns, 30 ns, 25 ns, 20 ns, 15 ns, 10 ns, 5 ns or 2 ns (increasingly preferred in the order mentioned). In principle, a pulse which is as short as possible may be preferred, but for technical reasons lower limits may be for example at least 0.001 ns, 0.01 ns or 0.1 ns.

The way in which the object information is evaluated, or derived or read out from the detector signal of the radiation detector, may in detail also depend on the structure of the radiation detector itself. If the object information is for example frequency-encoded, i.e. markers assigned to different object classes emit with a different wavelength, assignment to the respective marker may already be provided by corresponding filtering of a respective sensor face. With a respective sensor face, the respective marker radiation can only be detected when it has the "matching" wavelength, i.e. it passes through the filter onto the sensor face. To this extent, the situation that a detection signal is output at all may indicate that a particular marker is emitting, i.e. its object information is present. On the other hand, however, the object information may also be modulated for example onto the marker radiation (see below in detail), in which case it may thus, for example, be read out by corresponding signal processing.

As already mentioned above, the marker radiation is emitted by the marker, and in this there is already a difference to any part, merely reflected at the marker, of the distance measuring radiation. The marker radiation is different to any distance measuring radiation reflected at the marker. Insofar as information relating to the location or the position of the marker in the object space may be stored in abstract consideration in the reflected distance measuring radiation, in contrast thereto more extensive information for the object recognition is furthermore contained in the marker radiation. The marker radiation may differ in its frequency (wavelength) from the distance measuring radiation, or as an alternative or in addition the object information may be modulated on.

In various embodiments, the marker is a passive marker. This emits the marker radiation in response to excitation with the distance measuring radiation, for example because of photophysical processes in the marker material. The marker radiation preferably has a different wavelength to the distance measuring radiation, in which case the wavelength difference may result as an energy difference between different occupation states. In general, the marker radiation may also be higher in energy than the distance measuring radiation (so-called up-conversion), i.e. have a shorter wavelength. Down-conversion may be provided, i.e. the marker radiation has a lower energy and correspondingly a longer wavelength than the distance measuring radiation.

In various embodiments, the passive marker is a fluorescent marker (although in general a phosphorescent marker could for example also be envisioned). Use of quantum dots (for example of CdTe, or CdTe) may be provided because the emission properties of these can be adjusted well, i.e. particular wavelengths can be deliberately defined. An optimal wavelength can therefore also be established well for a respective object class.

In various embodiments, the marker is an active marker. This has an electrical radiation receiver and an electrical radiation emitter, the latter emitting the marker radiation in response to activation of the marker by the radiation of the radiation receiver with the distance measuring radiation. The receiver may for example be a photodiode, and a light-emitting diode (LED) may for example be provided as the emitter. An LED typically emits with a relatively wide angle (in general Lambertially), which may be provided insofar as the likelihood that a part of the radiation will strike the radiation detector (of the distance measuring system) is then correspondingly high.

A corresponding active marker may furthermore, for example, include driver electronics for the radiation emitter and/or also evaluation or logic functions. The emitter may, for example, be supplied by means of an integrated energy source (battery, disposable or rechargeable). Depending on the place of use or application, the emitter and receiver, and if present further component parts, may be combined as a module and packaged together. As an alternative or in addition, however, one or more decentral emitters may for example also be assigned to a receiver.

The marker may, for example, be integrated into an article of clothing, for instance a jacket. The article of clothing as a whole may then, for example, be equipped with a plurality of markers which either function independently of one another as decentral units (as an example in each case packaged independently) or in combination with one another share certain functionalities (for example the power supply and/or the receiver, or certain logic, etc.). Independently thereof in detail, the present approach, i.e. the labeling by means of marker radiation, may also even allow substantial differentiation in that, for example, not all of the article of clothing is provided with the same object information. In relation to the person who is then wearing the article of clothing, for example arms and/or legs may be labeled differently than the torso, which may open up more extensive evaluation possibilities. On the other hand, however, it may also be preferred that, whenever an object is provided with a plurality of markers, these carry the same object information, and are in particular of identical design.

In general, in a configuration, the marker is configured so that a time offset between the activation and the emission remains relatively small, namely increasingly e.g. in the order mentioned not more than 100 ns, 50 ns, 20 ns, 10 ns or 5 ns. Specifically, the period of time is considered which lies between the first incidence of the distance measuring radiation on the receiver of the marker and the start of the emission by its emitter. A response signal generated to this extent substantially without a delay, a reaction time of around 1 ns being preferred, may be advantageous in relation to the phasing into the actual distance measurement. The response of the marker is then, expressed in a simplified way, still synchronized with the actual distance measurement, which may be provided in relation to the assignability to a particular object space segment. Lower limits of the time offset may, for technical reasons, be for example 0.01 ns, 0.1 ns or 0.5 ns.

In general, the emission of the active marker may ly in the infrared range, in which case, for example, irritation to other road users may be avoided. In relation to exemplary wavelength intervals, explicit reference is made to the above disclosure regarding the infrared wavelengths of the distance measuring unit, which also constitute exemplary ranges in the case of the marker (even if the marker radiation and the distance measuring radiation should not have exactly the same wavelength).

In various embodiments, the object information is modulated onto the marker radiation of the active marker. To the extent that in general, in a comparable way to the passive marker, exclusively wavelength-encoded information storage may also be envisioned with the active marker, the modulation of the marker radiation may, for example, help to increase the transmittable information content. For example, data regarding the position and/or movement trajectories may additionally be stored. The modulation may be combined with wavelength encoding, although they are exemplary alternatives. The distance measuring radiation and the modulated marker radiation may have the same wavelength. Insofar as in the present case spectral intensity distributions are generally compared with one another (i.e. reference is made to "the same" or "different" wavelengths), this applies to a comparison of the dominant wavelengths and is thus not intended to imply discrete spectra (which are possible, but not necessary).

The object information may, for example, be stored by means of amplitude modulation. The marker radiation may thus also be emitted as a continuous signal, in which case the information is given from the variation of its amplitude as a time profile. In general, the information with the modulation may, for example, be transmitted in a similar way to Morse code, conventional communication standards may be employed, or a separate protocol may also be defined.

In a configuration, the marker radiation is emitted as a time-discrete signal, i.e. the information is stored in a pulse sequence. In this case, in general, a combination with amplitude modulation is also possible, although it may be an alternative. The information may then, for example, be given by the pulse sequence, i.e. its number and/or the time offset between the individual pulses.

As already mentioned, in a configuration the marker radiation has at least one spectral overlap with the distance measuring radiation, i.e. the intensity distributions have at least one common subset. In various embodiments, radiation actually with the same wavelength may be involved. This may lead to integration insofar as the detector, with which the marker radiation is received, is a component part of the distance measuring unit. Thus, on the one hand the marker radiation and on the other hand the distance measuring radiation reflected back from the object space are then recorded with the same detector.

Another embodiment, which may be of interest independently of the encoding of the object information according to the main claim, and which is intended to be disclosed, relates to a situation in which a part of the distance measuring radiation is reflected at the object as an echo pulse back to the distance measuring unit. Then, in a configuration, the active marker emits the marker radiation in such a way that this echo pulse is amplified; thus, in other words, the apparent reflectivity is increased. As an alternative or in addition to the encoding of the object category, it is therefore also possible to increase the detection range of the emitting distance measuring unit.

To this end, the marker, for example with a sufficiently short time delay (1 ns or less) relative to the incident distance measuring radiation, would generate a response signal with a sufficiently similar wavelength (~+/−10 nm or less) and sufficiently similar pulse shape. This would be superimposed on the echo signal (echo pulse) which results on the object carrying the marker, and therefore would amplify it or increase the apparent reflectivity. As a consequence thereof, the signal striking the detector unit of the distance measuring system is correspondingly increased so that the detection range is correspondingly enlarged. In this case, it may be advantageous for the marker unit to be capable of recording the solid angle from which the distance measuring radiation arrives, and of deliberately emitting the marker radiation into this.

Various embodiments also relate to a distance measuring system having a distance measuring unit, a radiation detector and an evaluation unit. The detector may be part of the distance measuring unit (see above), although it may also be provided separately. During operation, the distance measuring unit emits its pulses, i.e. the distance measuring radiation, into the object space, cf. the indications above. The distance measuring system is then firstly configured so that distance measuring radiation reflected at any objects located in the object space is recorded and the object distance is determined by means of the signal time of flight. In addition, with the radiation detector (which may be part of the distance measuring system, but need not be), if the object is provided with a marker, its marker radiation may be recorded. A corresponding detection signal is then delivered to the evaluation unit, with which the object information is read out and assigned to the object.

At the same time, the evaluation unit may also evaluate the data of the distance measurement, and e.g. generate a two- or three-dimensional image of the object space. This may, however, also be carried out in a separate logic unit which, for example, may be decentrally assigned exclusively to the evaluation unit or stored centrally, for example in an on-board computer of the motor vehicle. In various embodiments, the results of the distance measurements and the object recognition with the aid of the marker radiation are then at least correlated or combined with one another. For example, feedback is also possible to the extent that an object identified, i.e. assigned to a particular object class, in the object field with the aid of the marker radiation is provided with a virtual marker in the generated 2D or 3D model. This virtual marker then sticks to the object, and moves with the object in the event of any position change.

As already mentioned, for the assignment of the object information or for the object classification, a database is ideally employed in which the individual object classes or object information are stored. This database may be stored in the evaluation unit itself, although it may for example also be stored remotely, for example in a cloud application.

The exemplary solid angle-resolving distance measuring unit may in detail be configured differently. The solid angle resolution may on the one hand be provided by solid angle-selective emission of the pulses, in which the pulses are emitted in succession (sequentially) into the individual segments of the object space. The pulsing of the individual segments may, for example, be achieved by means of a mobile mirror (in particular MEMS mirror). Before a respectively following pulse is emitted, a delay is carried out for a particular pause length corresponding to the range of the distance measuring unit. Figuratively speaking, "listening" is carried out for whether a reflected pulse (echo pulse) comes back from the respective segment. A receiver unit of the distance measuring unit may, in this case, then also be configured for integral measurement, i.e. it may not itself be solid angle-selective.

On the other hand, precisely the opposite structure is also possible, i.e. the pulses may be emitted without further differentiation respectively into the entire object field, because in that case any echo pulses reflected back from individual segments of objects located there are recorded with solid angle resolution. Combinations are also possible, so that for example emission is carried out sequentially on one axis and reception is carried out with solid angle resolution on a different one. Various configurations of the radiation detector will be discussed below, i.e. configurations of the detector for recording the marker radiation (with which the distance measuring radiation may also be recorded, but need not).

In various embodiments, the radiation detector includes a multiplicity of sensitive sensor faces, which are configured relative to one another respectively in order to detect a different spectral range. In this variant, as in the variants discussed below, the sensitive sensor faces may on the one hand be respectively assigned to their own sensor, i.e. for example the sensor face may respectively be a respective photodiode. On the other hand, however, an integral embodiment is also possible, i.e. the sensor faces may be assigned to the same component, for example to a CCD array or CMOS array. Independently of the implementation in detail, radiation striking the respective sensor faces may respectively be recorded or assigned separately.

With the multiplicity of sensor faces, either, as just mentioned, spectral resolution may be carried out, but likewise solid angle resolution is possible (see below). The spectral resolution is preferably achieved by correspondingly different filtering of the sensor faces. The filters may be selected in such a way that in each case only radiation of the "matching" spectral range reaches the sensor face. To this end, for example, corresponding color filters may be used.

In various embodiments, which likewise relate to a radiation detector having a multiplicity of sensor faces, these are respectively configured for detecting a different segment of the object space. In one simple case, for example, a plurality of photodiodes may again be envisaged, which are oriented at a tilt with respect to one another respectively in their own direction. In various embodiments, common optics are assigned to the sensor faces, e.g. in an integral embodiment (CMOS or CCD). These optics, generally a converging lens or a converging lens system, convert a solid angle distribution into a spatial distribution, i.e. they guide radiation coming from a respective direction respectively onto a separate sensor face. Therefore, and particularly in the case of a distance measuring unit in which the individual segments are pulsed not sequentially but simultaneously (see above), the marker radiation may then be assigned in the position of space, i.e. solid angle resolution is provided.

The spectral resolution and the solid angle resolution may be alternatives, but a combination is also possible. The radiation detector may, for example, be configured as a so-called Bayer sensor, i.e. provided with a color filter (a plurality of colors), which defines a particular pattern and therefore also the solid angle resolution. In various embodiments, all the colors are respectively recorded separately per solid angle segment.

In various embodiments, the distance measuring unit for emission of the distance measuring radiation includes an infrared source, e.g. a laser source. The distance measuring radiation is then therefore infrared radiation, see the indications in the introduction.

Various embodiments also relate to a passive marker (see above) which is added to a detergent; a corresponding use is also expressly intended to be disclosed. The detergent is provided or used in order to clean textiles, and it may be a mixture of different substances in liquid, gel-like or powdered form. It contains active washing substances.

If an article of clothing, for example pants or a jacket, is washed with the detergent to which a marker has been added, the marker then remains at least partially (in traces) in the article of clothing. The latter is then provided over a very large area with, for example, the quantum dots, so that corresponding labeling is then ensured for the participation in road traffic.

Various embodiment also relate to a use of markers, in which objects assigned to different object classes are provided with markers that differ in their object information. Conversely, objects which are assigned to the same object class are then provided with markers that carry the same object information, and are e.g. of identical design to one another. Such object classes may, for example, be "pedestrians" and "vehicles", although further differentiation is of course also possible. For pedestrians, a distinction may for example be made between adults and children, although persons with a sensory disability (blindness, deafness, etc.) or persons with a physical disability may also carry a marker having corresponding object information, so that account may correspondingly be taken particularly with the driving strategy of semiautonomously or fully autonomously driving vehicles. For vehicles, for example, motor vehicles may be distinguished from bicycles, and further subdivision is also possible for motor vehicles (car, truck, motorcycle). Lastly, for example, pets may also be provided with their own object information.

The way in which this is then implemented in detail, i.e. which wavelengths are assigned to which object classes, may for example be established by the legislator or incorporated in standardization bodies. In the case of passive markers, the individual object classes would then, for example, respectively be assigned their own fluorescence wavelength.

In various embodiments, a marker may be integrated into a unit which can be carried on the body, for example as part of an article of clothing. The marker may, for example, be integrated into a segment thereof, or for example also be distributed over the entire article of clothing (particularly in the case of passive markers). So-called wearables, i.e. computer units which can be worn on the body, for example a smartwatch, may also be marker-labeled. The same applies for other accessories, such as jewelry and the like, and e.g. also rucksacks or bags, in which case satchels may be particularly relevant.

In various embodiments, at least some of the markers are fitted as external, independently packaged units on terrestrial vehicles. This may e.g. apply to bicycles and/or motorcycles and retrofitting with corresponding markers is possible. Thus, any road user may themselves decide to increase his or her "visibility" in road traffic with a corresponding retrofit part. Such marker units are packaged, and may be active markers which are protected in a weatherproof fashion in the package.

FIG. 1A, FIG. B show a distance measuring unit 1, which is installed in a motor vehicle 2 and is oriented in the driving direction (forward). With the distance measuring unit, the distance to objects 21a,b, for example other vehicles or pedestrians, etc., can be measured when these objects 21a,b are located in the object space 4 of the distance measuring unit 1. The object space 4, which has a horizontal aperture angle $\alpha$ and a vertical aperture angle $\beta$, is subdivided into a multiplicity of solid angle segments 5, each of which has an aperture angle $\delta\alpha$, $\delta\beta$, cf. also FIG. 2a for illustration.

The distance measurement is carried out with resolution according to the solid angle segments 5, i.e. for example the object 21a can be distinguished from the object 21b as being located in different solid angle segments 5. Depending on the condition (size, surfaces, etc.) as well as the distance of the object, differentiation may even be carried out within a respective object 3a,b. For the distance measurement, a pulse 6 is respectively emitted, which, if there is an object in the respective solid angle segment 5, comes back as an echo pulse 7 and is received.

FIG. 2 illustrates the method according to various embodiments in a schematic representation. Again shown is the motor vehicle 2 having the distance measuring unit 1, the object space 4 of which is now no longer shown segmented for the sake of clarity. The motor vehicle 2 is driving on a road 20 in a built-up area, in the representation from the bottom upward.

Three objects 21 are entering the object space 4, namely a pedestrian 21a on the sidewalk, a traffic sign 21b and a cyclist 21c on the opposite lane. Each of these objects 21 is provided with a respective marker 22a,b,c, which may be a passive or active marker. Depending on their configuration in detail, the markers 22a,b,c are either excited (passive marker) or activated (active marker) by the distance measuring radiation 23, which the distance measuring unit 1 emits into the object space 4.

A passive marker is in the present case provided as a fluorescent marker, e.g. based on quantum dots (cf. also the introduction to the description). An active marker, on the other hand, includes an electrical radiation receiver and an electrical radiation emitter, as well as logic and driver electronics.

Independently of the configuration in detail, a respective marker 21a,b,c at least emits respective marker radiation 25a,b,c in response to the irradiation with the distance measuring radiation 23. The marker radiation 25a,b,c respectively emitted by the individual markers 22a,b,c differs, and namely separate object information is respectively stored. The respective marker radiation 25a,b,c can be recorded with the radiation detector 30, which may be provided as part of the distance measuring unit 1 or alternatively as a separate element. A respective detection signal is delivered to an evaluation unit 27, and the respective object information is read out and assigned to the respective object 21a,b,c. The object information allows simple and rapid assignment of the respective object 21a,b,c to a respective object class, in the present case "pedestrian", "traffic sign", "cyclist".

In the schematic representation, the respective marker radiation 25a,b,c is represented by dashes, although in practice the emission will be somewhat wider in angle, or even omnidirectional—although some marker radiation 25a, b,c always strikes the radiation detector 30. In practice, a plurality of detector units arranged at a distance from one another may also be combined, which may also open up the possibility of locating by triangulation.

In the case of passive markers, the object information is wavelength-encoded, i.e. the various markers 22a,b,c are provided with different fluorescence wavelengths, e.g. provided with correspondingly different quantum dots. In the case of active markers, the object information may be modulated onto the respective marker radiation 25a,b,c, e.g. stored in a time-discrete signal, for example in the manner of Morse code. In relation to further details and possibilities, explicit reference is made to the introduction to the description.

Figure 3:
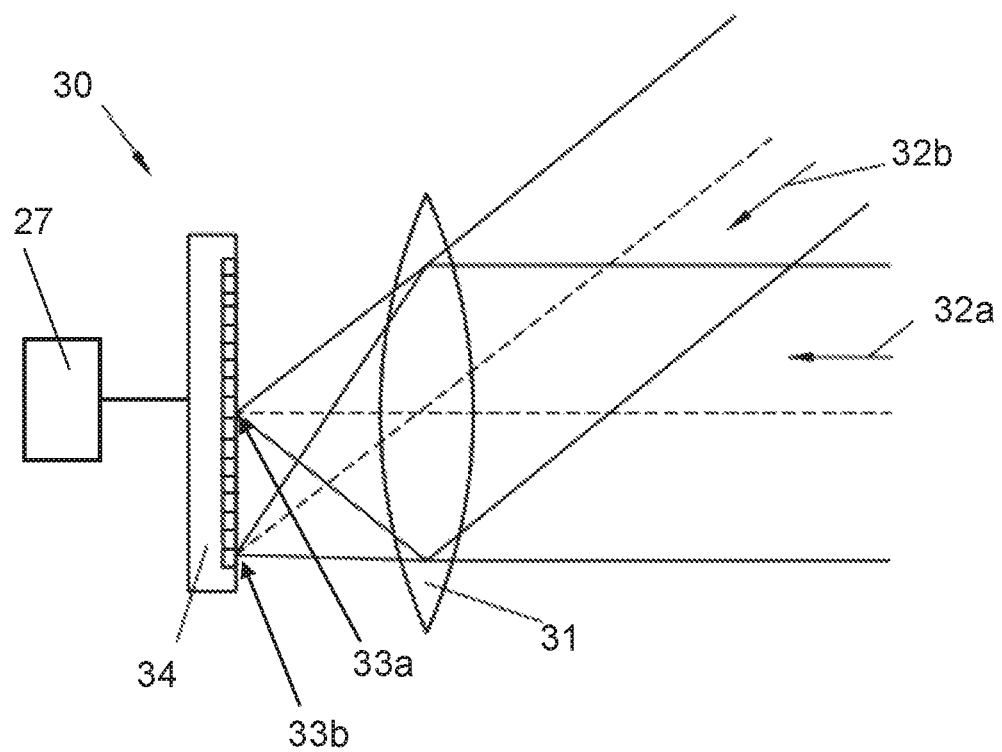
FIG. 3 shows a radiation detector for carrying out the method according to FIG. 2 in a schematic representation.

FIG. 3 shows the radiation detector 30 in a detailed view. A plurality of sensitive sensor faces 33a,b are provided, which in the present case are provided integrally as part of the same component 34. This example involves a CCD (charge coupled device) array. The latter is as signed imaging optics 31 so that marker radiation 25a,b,c incident from different spatial directions 32a,b is respectively guided onto a separate one of the sensitive sensor faces 33a,b. The marker radiation 25a,b,c can therefore be received with solid angle resolution.

The respective object information may correspondingly also be assigned to a respective segment 5 of the object space 4. The object classification by means of the marker radiation 25a,b,c is furthermore matched with evaluation of the distance measurements, which on the one hand serves for plausibilization, but on the other hand can also reduce the further computation outlay. The latter is advantageous particularly with a view to semiautonomous or fully autonomous driving (shorter reaction times, etc.).

LIST OF REFERENCE SIGNS

| distance measuring unit | 1 |
| motor vehicle | 2 |
| Objects | 3a, b |
| object space | 4 |
| horizontal aperture angle | α |
| vertical aperture angle | β |
| solid angle segments | 5 |
| Pulse | 6 |
| echo pulse | 7 |
| Road | 20 |
| Pedestrian | 21a |
| Cyclist | 21c |
| Objects | 21a, b |
| Markers | 22a, b, c |
| distance measuring radiation | 23 |
| marker radiation | 25a, b, c |
| evaluation unit | 27 |
| radiation detector | 30 |
| Component | 34 |
| spatial directions | 32a, b |
| sensor faces | 33a, b |

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for recognizing an object located in an object space, the method comprising:
emitting a distance measuring pulse into the object space by a signal time-of-flight based distance measuring unit;
simultaneously receiving and detecting electromagnetic marker radiation from a plurality of different segments of an object space, in response to the influence of the distance measuring pulse, in which object information for the object recognition is stored, wherein the electromagnetic marker radiation is fluorescent marker radiation;
recording the marker radiation by an electrical radiation detector and the object information for object recognition being assigned to the object.

2. The method of claim 1, wherein the distance measuring unit emits the n distance measuring pulse into the object space in the form of electromagnetic distance measuring radiation.

3. The method of claim 1, wherein the fluorescent marker is a passive marker which emits the marker radiation in response to excitation with the distance measuring radiation.

4. The method of claim 1, wherein the marker radiation differs in its spectral properties from the distance measuring radiation.

5. The method of claim 1, wherein the fluorescent marker is a phosphorescent marker.

6. The method of claim 1, wherein the fluorescent marker comprises quantum dots.

7. The method of claim 1, wherein the fluorescent marker is an active marker having an electrical radiation receiver and an electrical radiation emitter, the activation of the active marker configured to be activated by irradiation of the radiation receiver from the distance measuring radiation and further configured to emit the marker radiation in response to said activation.

8. The method of claim 7, wherein a time offset between the activation by irradiation and the emission of the radiation emitter is at most 100 ns.

9. The method of claim 7, wherein a part of the distance measuring radiation is reflected back at the object as an echo pulse to the distance measuring unit, the active marker emitting the marker radiation in such a way that this echo pulse is amplified.

10. The method of claim 7, wherein the fluorescent marker is an active marker comprising a light emitting diode.

11. The method of claim 7, wherein a spectral intensity distribution of the marker radiation has at least one overlap with a spectral intensity distribution of the distance measuring radiation, and the radiation detector with which the marker radiation is recorded is also used to record a part, reflected back from the object space, of the distance measuring radiation.

12. The method of claim 1, in which use objects which are assigned to different object classes are provided with markers, wherein the respective marker radiation of which respectively different object information is stored.

13. The method of claim 12, wherein at least some of the markers are integrated in units which can be carried on the body.

14. A distance measuring system, comprising:
a distance measuring unit;
an electromagnetic radiation detector comprising a multiplicity of sensitive sensor faces, which are configured relative to one another respectively in order to detect different segments of object space; and
an evaluation unit, which is connected to the radiation detector and to which a detector signal of the radiation detector is thus delivered;
wherein the distance measuring system is configured to carry out a method for recognizing an object located in an object space, the method comprising:
emitting a distance measuring pulse into the object space by a signal time-of-flight based distance measuring unit;
receiving and detecting electromagnetic marker radiation from the object, in response to the influence of the distance measuring pulse, in which object information for the object recognition is stored, wherein the electromagnetic marker radiation is fluorescent marker radiation;
recording the marker radiation by an electrical radiation detector and the object information for object recognition being assigned to the object;
wherein the distance measuring unit emits the distance measuring pulse into the object space in the form of electromagnetic distance measuring radiation;
wherein the evaluation unit is configured to read out the object information for object recognition from the detector signal and assign it to the object.

15. The distance measuring system of claim 14, wherein the fluorescent marker is an active marker comprising a light emitting diode.

16. The distance measuring system of claim 14, wherein the radiation detector comprises a multiplicity of sensitive sensor faces, which are configured relative to one another respectively in order to detect a different spectral range, preferably by correspondingly different filtering.

17. The distance measuring system of claim 14, wherein the multiplicity of sensitive sensor faces is configured to detect different segments of object space simultaneously.

18. The distance measuring system of claim 14, wherein the electromagnetic radiation detector further comprises at least a converging lens to assist in detecting the different segments of the object space.

19. The distance measuring system of claim 14, wherein the distance measuring unit comprises an infrared source for emission of the distance measuring radiation.

20. The distance measuring system of claim 14, wherein the electromagnetic radiation detector is a Bayer sensor.

* * * * *